May 3, 1960 W. T. GRAHAM 2,935,144
CLAMP FOR VIBRATING SHANK PLOW
Filed June 5, 1957 2 Sheets-Sheet 1

INVENTOR.
William T. Graham.
BY Fishburn & Gold
ATTORNEYS.

May 3, 1960 W. T. GRAHAM 2,935,144
CLAMP FOR VIBRATING SHANK PLOW
Filed June 5, 1957 2 Sheets-Sheet 2
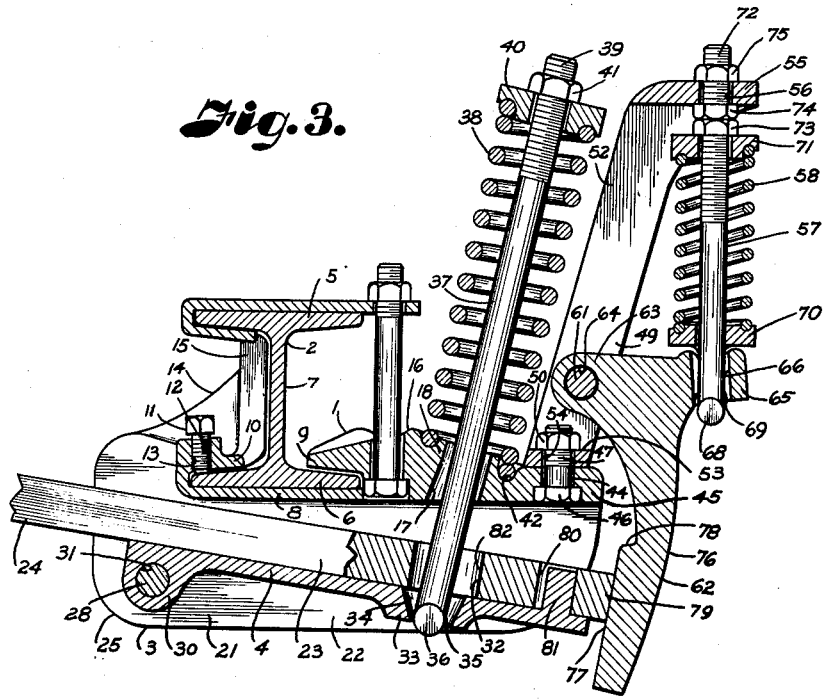
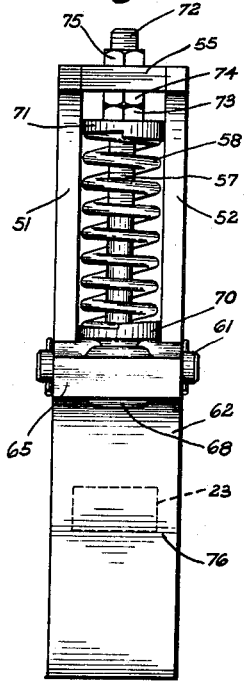
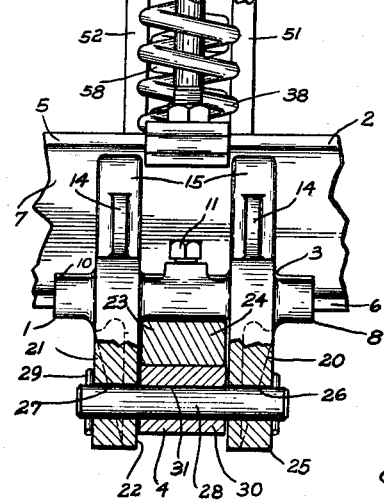
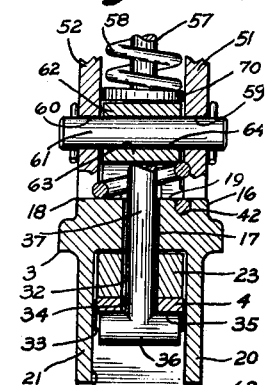
INVENTOR.
William T. Graham.
BY
Fishburn & Gold
ATTORNEYS.

United States Patent Office 2,935,144
Patented May 3, 1960

2,935,144

CLAMP FOR VIBRATING SHANK PLOW

William T. Graham, Amarillo, Tex.

Application June 5, 1957, Serial No. 663,719

5 Claims. (Cl. 172—265)

This invention relates to a plow of the type including ground conditioning tools that are carried on shanks having support on a mobile frame, and more particularly to clamping devices for fastening the shanks to the frame.

This invention relates to the clamp of a type shown in my Patent Nos. 2,493,811 and 2,627,798 and is an improvement thereon for relieving the tension on the main spring of the clamp when in use.

The principal objects of the present invention are to provide a clamp for fastening the shank of a plow of the character here involved to the I-beam of the plow to take the initial strain or tension off of the spring of the clamp when the plow is in operation; to provide a mounting for attaching the shanks of the ground working tools to the mobile frame whereby the shanks may rock and vibrate under action when the plow is working in heavy soil or rocky conditions; to provide the forward portion of the clamping member with spring means for allowing the shank to rock when the force on the rear end of the shank overcomes a natural tendency for the ground working tools to operate in a straight line position; to provide means on the movable part of the clamp for holding the shank from being pulled from the clamp; to provide auxiliary spring means having a cam lever having a shoulder for engaging the ends of the shank to hold the shank in horizontal position with respect to the body of the clamp to relieve the main spring of tension until the force on the rear of the shank or ground working tool overcomes the secondary spring action to allow the end of the shank to be disengaged from the shoulder of the lever portion of the clamp so that the main spring will be in action to provide the resilient mounting of the shank; to provide bracket means on the fixed portion of the clamp for mounting the spring and the cam lever in position to engage the end of the shank, and to provide a device of this character simple and economical to manufacture.

In accomplishing these and other objects of the invention, I have provided improved details of structure, the preferred forms of which are illustrated in the accompanying drawings, wherein:

Fig. 3 is a view similar to Fig. 2 but showing the cam lever disengaged from the end of the shank.

Fig. 4 is a front view of the device.

Fig. 5 is a fragmentary partly cross-sectional view taken on a line 5—5, Fig. 2.

Fig. 6 is a fragmentary cross-sectional view taken on a line 6—6, Fig. 2.

Figure 1:
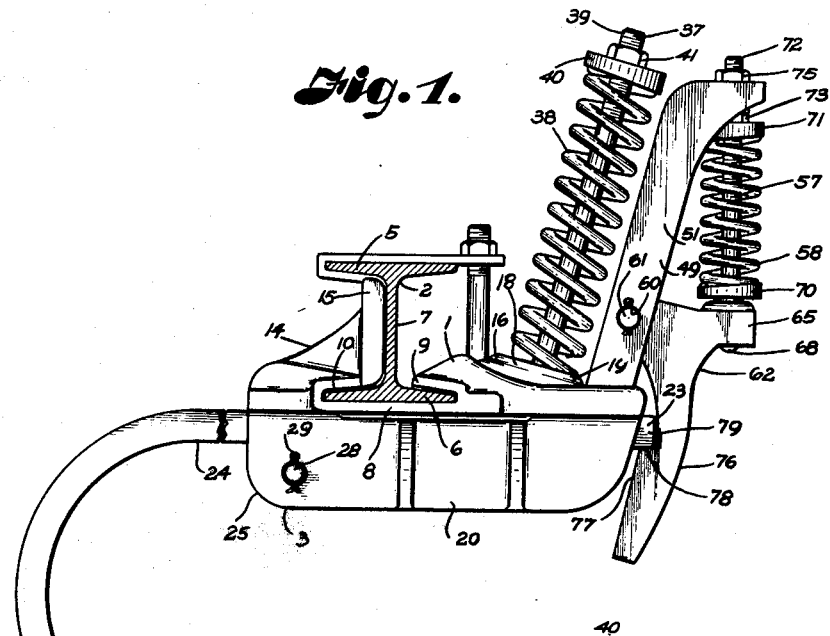
Fig. 1 is a side view of the clamping member embodying the features of my invention with the I-beam shown in cross-section.

Referring more in detail to the drawings:

1 designates a clamp embodying the features of my invention shown attached to an I-beam 2 of a plow (not shown) but of a character illustrated in my Patent No. 2,493,811. The clamp comprises a fixed bracket or member 3 and a movable part or plate member 4 sometimes referred to as a fulcrum plate. The I-beam has an upper flange 5 and a lower flange 6 connected by a web portion 7. The fixed part 3 has a substantially flat plate portion 8 corresponding in length to the width of the lower flange 6 of the I-beam and which is closely engaged therewith by flanges 9 and 10 extending over the upper face of the lower flange 6 as illustrated in Fig. 1. The flange 10 carries a set screw 11 which has its shank 12 threaded in an opening 13 of the flange to engage the upper face of the flange 6 and draw the plate portion 8 of the fixed part into engagement with the lower face of the flange 6 and assure a firm connection with the I-beam. The flange 10 also includes webs 14 having plate portions 15 engaging against the web 7 of the I-beam to act as a brace against the web portion of the I-beam and preventing bending of the lower flange thereof.

Projecting forwardly from the plate portion 8 and flange 9 is a relatively thicker extension 16 provided with a slot-like opening 17 extending through a boss 18 that forms a spring seat 19. Depending from the underside of the plate portion 8 and extending both forwardly and rearwardly therefrom are flanges 20 and 21 spaced apart to form a downwardly open channel or way 22 therebetween and in which the end portion 23 of a plow shank 24 is adapted to pivot. The rear portions 25 of the flanges 20 and 21 are provided with aligned openings 26 and 27 and adapted to receive a pin 28 held in place by cotter pins or the like 29. The movable member 4 has a downwardly extending lug 30 provided with a transverse opening 31 through which the pin 28 extends to pivotally mount the movable plate member on the fixed member.

The straight end portion 23 of the shank 24 is provided with an elongated opening 32 adapted to align with the opening 17 in the fixed member and the movable member 4 has an enlarged portion or rib 33 extending across the lower face thereof and spaced from the forward end. The rib portion and the movable member has an opening 34 also aligning with the opening 32 in the shank in the opening 17 in the fixed member. The rib has a transverse groove 35 adapted to receive a T-head 36 of a rod 37, the rod extending through the openings 34, 32 and 17 respectively and mounted thereon is a coil spring 38. The rod has a threaded upper end as indicated at 39 and a washer 40 engages thereover and against which the upper end of the spring engages. The washer is held on the rod by a threaded nut 41. The other end of the spring seats on the seat 19 of the boss 16 as illustrated in Fig. 3.

It will be noted the opening 17 in the enlarged portion of the fixed member is set at an angle and a groove 42 in the boss 16 is also placed so that the spring is set at an angle thereon so that when the rod is moved downwardly through action of the fulcrum plate 4, the spring will set in alignment with the rod. The opening 32 in the shank is slightly larger than the other openings and the opening 34 is cone-shaped so that there is free action of the rod through the openings and there will be no binding on the sides of such openings.

The forwardly extending thickened extension 16 of the fixed member 3 is provided with a seat portion having an opening 44 extending vertically therethrough and has an enlarged portion on the underneath side forming a socket 45 for a head 46 of a bolt 47. The free end of the bolt is threaded as indicated at 48 and mounted on the bolt is a bracket 49 and held in place thereon by a nut 50.

The bracket 49 comprises spaced arms 51 and 52 and connected at the lower end by an arm 53 having an opening 54 through which the bolt 47 extends. The upper end of the arms 51 and 52 are connected by a bar 55 having an opening 56 for receiving a rod 57 upon which is mounted a coil spring 58. The spaced arms 51 and 52 are provided near the lower end with aligned openings 59 and 60 adapted to receive a pin 61 for mounting a cam lever or latch member 62. The lever 62 has an ear 63 which extends between the arms 51 and 52 of the bracket and is provided with an opening 64 to receive the pin 61 to pivotally mount the lever in the bracket. Formed oppositely from the ear 63 is an extension 65 having an opening 66 vertically therethrough for receiving the lower end of the rod 57 which rod has a T-head 68 thereon engaging in a groove 69 on the lower side of the extension. A washer 70 is sleeved on the rod 57 forming a seat for the lower end of the spring 58 and a washer 71 is sleeved on the upper portion of the rod forming a seat for the upper end of the coil spring. The rod 57 is threaded as indicated at 72 and a lock nut 73 is threaded thereon to adjust the tension of the spring 57 to the washer 71. A lock nut 74 is also mounted on the threaded portion of the rod 57 underneath the arm 55 to mount the rod and adjust the tension of the spring and a nut 75 is provided for holding the rod 57 in the bracket.

The lever or latch 62 is elongated and extends downwardly from the pivoted point and is slightly curved as indicated at 76. The side of the elongated portion 76 nearest the clamp is provided with a cam surface 77 which forms a shoulder as indicated at 78 (Fig. 1) for engaging the underneath side of the end 79 of the forward end of the shank to hold the shank in normal plowing position and to remove the tension from the spring 38 due to movement of the shank away from the fixed member.

The forward end of the shank is provided with an opening 80 extending vertically therethrough and the forward end of the fulcrum plate 4 is provided with an upstanding transverse lug 81 adapted to engage in the opening 80. The lug retains the shank between the fulcrum plate and the fixed bracket and the opening 80 being slightly larger than the lug 81 will allow longitudinal movement of the shank and at the same time prevent the side 82 of the opening 32 in the shank from engaging against the spring rod 37 so that the rod will be free to move therethrough and prevent binding of the rod in the shank.

In assembling the ground working devices on the transverse I-beam 2 of the plow frame, the clamp brackets or fixed member 3 are slid onto the beam from the end thereof when the same is being assembled. The brackets are spaced on the respective beams and in relation to the brackets of the other beam so as to equalize the draft on the respective sides of the tongue (not shown) of the plow as illustrated in my Patent No. 2,493,811. When the brackets are in position they are rigidly anchored to the lower flanges 6 of the I-beam by the set screws 11 to pull the brackets against the bottom of the beam flanges.

In attaching the ground working devices the fulcrum plate or movable member 4 is inserted between the flanges 20 and 21 of the bracket and the rear end pivoted by the pin 28 to the brackets. The forward end of the shank is then inserted between the movable member 4 and the fixed bracket in the channel or way 22. The T-bolt 37 is then inserted through the openings 34, 32 and 17 respectively and the spring 38 mounted thereon to seat on the seat 42 of the extension 16 and the washer placed on the spring and then the nut 41 engaged therewith to hold the assembly together. The nut may be tightened to compress the spring in a sufficient amount to retain resiliently the ground working device in ground working position. The degree of compression of the spring being regulated in accordance with the hardness of the ground to be plowed.

The auxiliary spring mechanism is then mounted on the forward end of the fixed bracket by inserting the bolt 47 in the opening 44 and mounting the bracket 49 thereon by fastening of the nut 50. The lever 62 is then mounted between the arms of the bracket by insertion of the pin 61 through the opening in the ear 63 and the spring rod 57 inserted through the opening 66 in the extension 65 of the lever, the washer 70 sleeved thereon along with the coil spring 58 to seat on the washer and the washer 71 placed on the top of the spring. The lock nut 73 is then mounted on the threaded end of the spring rod along with the lock nut 74. The assembly is then held in the bracket by the nut 75.

Figure 2:
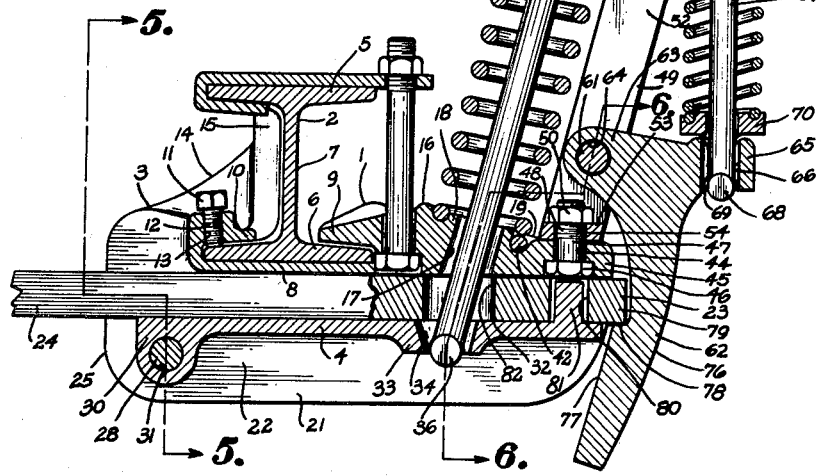
Fig. 2 is a longitudinal cross-sectional view through the device showing the end of the shank in engagement with the cam lever.

The tension of the spring 58 will exert downward pressure on the lever on the extension 65 to move the lever on the fulcrum or pivot point provided by the pin 61 to urge the cam surface 77 of the lever against the end of the shank as illustrated in Figs. 1, 2 and 3. When the shanks are in normal plowing position as shown in Fig. 1, the end 79 of the shank will engage the shoulder 78 on the cam surface of the lever and until the force on the rear portion of the shank due to the ground working tool moving through the ground exerts a pressure on the forward end of the shank to move the shank away from the cam shoulder 78.

When the pressure is great enough to move the end of the shank away from the latch or lever member then the spring 38 is effective and tension will be exerted thereon as illustrated in Fig. 3 but still allow the shank to rock on the fulcrum at the rear of the clamp and the spring 58 will then also be compressed due to movement of the extension 65 upwardly by force of the end of the shank against the cam surface 77 of the lever 62. The shoulder is slightly rounded and as the shank is vibrated and moves longitudinally rearwardly the end will be released from the shoulder. When the pressure is released from the rear of the shank sufficiently to allow the spring 38 to exert a pressure on the forward end of the shank and move it upwardly against the plate portion of the fixed member, the end 79 will then engage the shoulder 78 as illustrated in Fig. 2.

It will be obvious from the foregoing that I have provided an improved spring clamp for ground working tools of plows of the character here involved wherein an auxliary spring tension means and latch arrangement is provided for taking the initial thrust on the shank and allow the main spring to remain out of tension until the pressure on the shank overcomes the auxiliary spring tension due to seating of the end of the shank on the cam shoulder of the device.

What I claim and desire to secure by Letters Patent is:

1. In a plow having a frame and a ground working tool provided with a shank adapted to rock relative to the frame when the plow is in operation in a forward direction, a mounting for attaching and supporting the shank of the ground working tool from the frame including a fixed member secured to the frame and having an extension forwardly of said frame, a movable member having one end pivotally secured to the fixed member rearwardly of the frame and having an elongated plate portion for engaging the forward portion of said shank, a coil spring having one end seated on said fixed member, means having connection with the forward end of the shank and with the other end of the coil spring normally urging the forward end of the shank into engagement with the fixed member to maintain the normal depth of the ground working tool, means on the movable member cooperating with the shank for retaining the shank in said mounting with its forward end extending beyond the forward end of said fixed member, a bracket extending upwardly from the fixed member forwardly of said spring, means securing the bracket to the fixed member, a lever pivotally mounted on the lower portion of the bracket, said lever having a cam surface facing the end of the shank and having a shoulder thereon for engaging the end of the shank to hold said shank in engagement with the fixed member, and spring means connected to said lever and to said bracket urging the lever toward said shank whereby pressure on the rear portion of the shank will move the end of the shank off said shoulder to allow said coil spring to act on said shank to allow the shank to rock.

2. In a plow having a frame and a ground working tool provided with a shank adapted to rock relatively to the frame when the plow is in operation in a forward direction, a mounting for attaching and supporting the shank of the ground working tool from the frame including a fixed member secured to the frame and having an extension forwardly of said frame provided with an opening therethrough, a movable member having one end pivotally secured to the fixed member rearwardly of the frame and having an elongated plate portion for engaging the forward portion of said shank, said movable member and shank having openings therethrough aligning with the opening in said fixed member, a rod engaging in said openings and having a head engaging the underside of said movable member, a spring having one end engaged with said rod and the other with said fixed member for yieldingly permitting rocking movement of the movable member, said spring normally urging the forward end of the shank into engagement with the fixed member, means on the movable member cooperating with the shank for retaining the shank in said mounting with its forward end extending beyond the forward end of said fixed member, a bracket extending upwardly from the fixed member forwardly of said spring, means securing the bracket to the fixed member, a lever pivotally mounted to the lower portion of the bracket, said lever having a forwardly extending portion provided with an opening and a downwardly extending portion having a rearwardly extending face, and a rod having a head extending through the opening and having its upper end secured to the upper end of the bracket, a coil spring surrounding said rod and urging the lever toward the end of said shank, the rearwardly extending face of said lever having a cam surface and a shoulder, the end of the shank engaging on said shoulder when the shank is in normal working position and whereby pressure on the rear portion of the shank will move the end of the shank off said shoulder to allow the first spring to act on said shank through the first mentioned rod to allow the shank to rock.

3. In a plow having a frame and a ground working tool provided with a shank adapted to rock relatively to the frame when the plow is in operation in a forward direction, a mounting for attaching and supporting the shank of the ground working tool from the frame including a fixed member secured to the frame and having an extension forwardly of said frame provided with an opening therethrough, a movable member having one end pivotally secured to the fixed member rearwardly of the frame and having an elongated plate portion for engaging the forward portion of said shank, a coil spring having one end seated on said fixed member, means having connection with the forward end of the shank and with the other end of the coil spring normally urging the forward end of the shank into engagement with the fixed member to maintain the normal depth of the ground working tool, means on the movable member cooperating with the shank for retaining the shank in said mounting with its forward end extending beyond the forward end of said fixed member, a bracket extending upwardly from the fixed member forwardly of said spring, means securing the bracket to the fixed member, a lever pivotally mounted to the lower portion of the bracket, said lever having a forwardly extending portion provided with an opening and a downwardly extending portion having a rearwardly extending face, a coil spring seated on the forwardly extending portion of the lever, and means connected to said forwardly extending portion of the lever and to the upper end of the bracket whereby said last named spring will urge the lever toward the end of said shank, the rearwardly extending face of said lever having a cam surface and a shoulder, the end of the shank engaging on said shoulder when the shank is in normal working position and whereby pressure on the rear portion of the shank will move the end of the shank off said shoulder to allow the first spring to act on said shank to allow the shank to rock.

4. In a plow having a frame and a ground working tool provided with a shank adapted to rock relatively to the frame when the plow is in operation in a forward direction, a mounting for attaching and supporting the shank of the ground working tool from the frame including a fixed member secured to the frame and having an extension forwardly of said frame provided with an opening therethrough, a movable member having one end pivotally secured to the fixed member rearwardly of the frame and having an elongated plate portion for engaging the forward portion of said shank, said movable member and shank having openings therethrough aligning with the opening in said fixed member, a rod engaging in said openings and heaving a head engaging the underside of said movable member, a spring having one end engaged wtih said rod and the other with said bracket for yieldingly permitting rocking movement of the movable member, said spring normally urging the forward end of the shank into engagement with the fixed member, means on the movable member cooperating with the shank for retaining the shank in said mounting with its forward end extending beyond the forward end of said fixed member, an upstanding bracket having spaced arms and a top plate provided with an opening, means for mounting the bracket on the extension of the fixed member, a lever pivotally mounted to the lower portion of the bracket, said lever having a cam surface facing the end of the shank and having a shoulder thereon for engaging the end of the shank to hold said shank in engagement with the fixed member, and spring means connected to said lever and to said plate on the bracket urging the lever toward said shank, whereby pressure on the rear portion of the shank will move the end of the shank off said shoulder to allow the first spring to act on the shank to allow the shank to rock.

5. In a plow having a frame and a ground working tool provided with a shank adapted to rock relatively to the frame when the plow is in operation in a forward direction, a mounting for attaching and supporting the shank of the ground working tool from the frame including a fixed member secured to the frame and having an extension forwardly of said frame provided with an opening therethrough, a movable member having one end pivotally secured to the fixed member rearwardly of the frame and having an elongated plate portion for engaging the forward portion of said shank, said movable member and shank having openings therethrough aligning with the opening in said fixed member, a rod engaging in said openings and having a head engaging the underside of said movable member, a spring having one end engaged with said rod and the other with said fixed member for yieldingly permitting rocking movement of the movable member, said spring normally urging the forward end of the shank into engagement with the fixed member, said shank having an opening near the forward end thereof, a lug on the movable member engaging in the last mentioned opening in the shank for retaining the shank in said mounting with its forward end extending beyond the forward end of said fixed member, a bracket extending upwardly from the fixed member forwardly of said spring, means securing the bracket to the fixed member, a lever pivotally mounted to the lower portion of the bracket, said lever having a forwardly extending portion provided with an opening and a downwardly extending portion having a rearwardly extending face, a rod having a head extending through the opening and having its upper end secured to the upper end of the bracket, and a coil spring surrounding said rod and urging the lever toward the end of said shank, the rearwardly extending face of said lever having a cam surface and a shoulder, the end of the shank engaging on said shoulder when the shank is in normal working position and whereby pressure on the rear portion of the shank will move the end of the shank off said shoulder to allow the first spring to act on said shank through the first mentioned rod to allow the shank to rock.

References Cited in the file of this patent

UNITED STATES PATENTS

| | | |
|---|---|---|
| 1,078,871 | Olson | Nov. 18, 1913 |
| 1,253,961 | Grimsrud | Jan. 15, 1918 |
| 2,712,780 | Graham | July 12, 1955 |

FOREIGN PATENTS

| | | |
|---|---|---|
| 829,372 | Germany | Jan. 24, 1952 |